Dec. 31, 1929. A. Y. HALL 1,741,768
PIANO INSTRUCTION DEVICE
Filed May 3, 1928 2 Sheets-Sheet 1
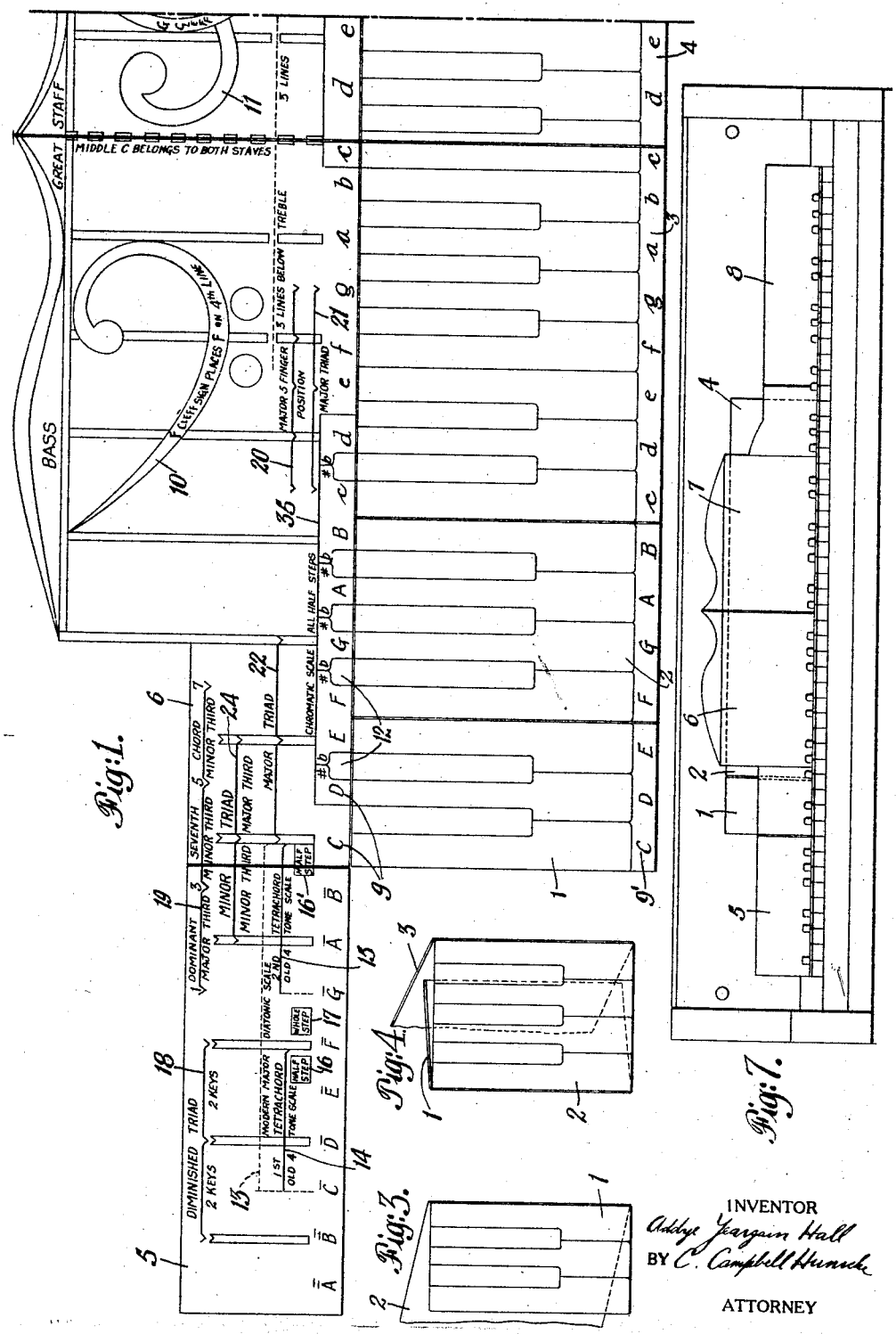

Dec. 31, 1929.  A. Y. HALL  1,741,768
PIANO INSTRUCTION DEVICE
Filed May 3, 1928   2 Sheets-Sheet 2
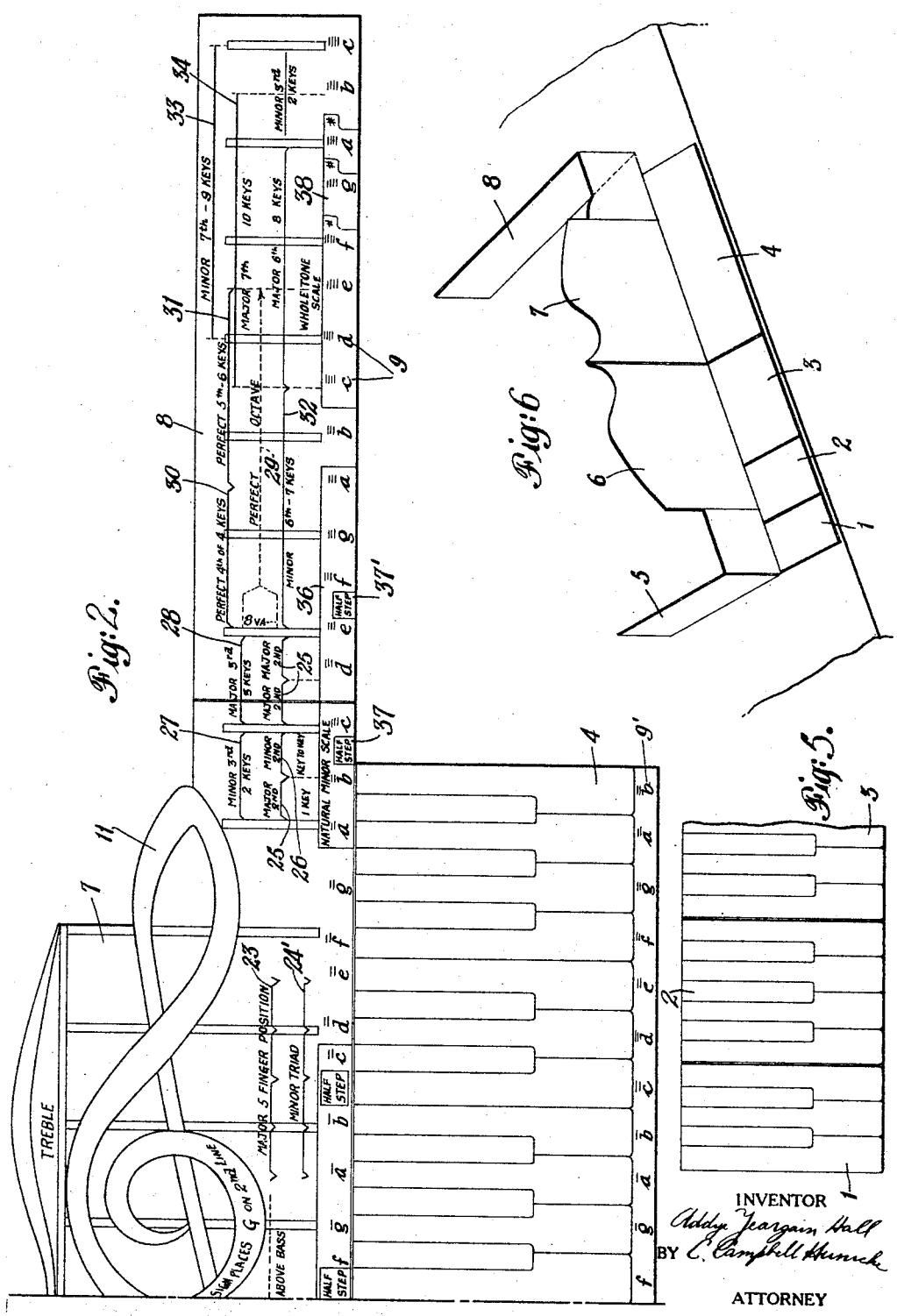

Patented Dec. 31, 1929

1,741,768

UNITED STATES PATENT OFFICE

ADDYE YEARGAIN HALL, OF NEW YORK, N. Y.

PIANO-INSTRUCTION DEVICE

Application filed May 3, 1928. Serial No. 274,694.

This invention relates to a device for the teaching of the theory and symbols of music.

In the teaching of music, not only must the pupil learn the meaning of the symbols but also the relationship of the keys, for instance of the piano, to these symbols. Other elements are of course present in the study of music such as time, rhythm and pitch.

The long seven octave keyboard when seen for the first time by the child holds no variety and usually leaves a blurred impression on the mind to say nothing of the confusion occasioned by the written music.

The object of this invention is to facilitate the instruction of music. Another object of this invention is to provide an inexpensive device that is adapted to instruction as to structure of the octave, location of octave groups, names of keys and their location on the piano, measurement of distances of intervals, shape of chords, scale patterns, sequences, five finger positions, recognition of chords, enharmonic relationships, accidentals, signatures, figured bass, close and open harmony and reading.

Referring to the drawings:

Figure 1 is a plan view of the left hand portion slightly beyond the center of an embodiment of my invention unfolded.

Figure 2 is a plan view of the right hand remaining portion of an embodiment of my invention unfolded.

Figure 3 shows section 1 of Figure 1 folded back to show the three white keys and two black keys forming a part of an octave.

Figure 4 shows section 2, of Figure 1, folded back to show four white keys and three black keys forming the balance of an octave.

Figure 5, shows sections 1 and 2 of Figure 1 unfolded to show the complete octave.

Figure 6, shows a perspective view of the device folded to stand upright upon a table.

Figure 7, shows the device placed upon the keyboard of a piano with sections 1, 2, 3, 4, folded back.

In carrying out my invention, I propose to provide a device as indicated in Figures 1 and 2, made of cardboard or other suitable material comprising eight sections, 1, 2, 3, 4, 5, 6, 7 and 8, joined by fabric hinges. Four sections 1, 2, 3 and 4, contain the representation of a dummy keyboard preferably the exact size of the keys. The first section 1 of the dummy keyboard comprises three white keys and two black. The second section 2 comprises four white keys and three black, and the third section 3 comprises seven and one-half white keys and five black keys. The fourth section comprises thirteen and one-half white keys and ten black keys. On the dummy keyboard at the bottom are letters 9' representing each white key. The first two sections 1 and 2 of the dummy keyboard are only hinged to each other and to the adjoining section 3 of the dummy keyboard. The balance of the keyboard is attached by means of a fabric hinge to the remaining sections. These latter sections 5, 6, 7 and 8, contain the representation of the eleven line staff and the F and G clef signs 10 and 11. The sections 5, 6, 7 and 8, not comprised in the dummy keyboard are called the staff sections. At the bottom of the staff sections spaced to correspond to the keys of a piano and to the dummy keys are letters 9 representing the various keys of a piano so that when the dummy keyboard is folded back the staff sections may be placed on the white keys to the rear of the black keys of the piano.

It should be noted that the black keys cover the outlined spaces 12 which have the notations indicating whether the black keys are sharps or flats. The lettering of the keys indicate the octave groups in accordance with the musical practice. The diatonic major scale is indicated by dotted line 13 which includes two tetrachords as indicated by line 14 and line 15. The half steps of the two tetrachords are indicated by squares 16, 16', and the whole step connecting the two tetrachords by rectangle 17.

The diminished triad chord B, D, and F, is indicated by line 18. The intervals between the keys of the chord and the number of keys of the chord are indicated below the line 18. The dominant seventh chord is indicated by line 19. The major triad on lines is indicated by line 22. The intervals and keys involved in the construction of the triad are likewise indicated below line 19. Line 20 indicates the five finger major position, and below it is line 21 indicating the major triad in spaces. Line 23 indicates the five finger major position and below it is line 24' which indicates the minor triad in spaces. Lines 25 and 26, indicate the shortest intervals on the keyboard that are named seconds. These intervals represent major, minor and two major seconds.

From A to C minor third 27, two keys between. C to E major third 28, three keys between. The fourth and fifth are included between dotted line 29 having arrow point terminates, the fourth being line 30, and the fifth being line 31. Below the fourths and fifths is line 32 representing the sixths. The intervals of sevenths are indicated by lines 33, 34, the lower one is a major 7 and the upper one is a minor seven. The lower 7 has ten keys between and the upper has nine keys between. The chromatic scale is shown by rectangle 35, the natural minor scale is shown by rectangle 36, with the half steps indicative at 37, 37', and the whole tone scale by diagram 38.

In utilizing this instruction device the children are first taught the construction of the keyboard. The dummy keyboard has section 1 folded back showing keys C, D and E, and then has section 2 folded back showing keys F, G, A and B, and then sections 1 and 2 are unfolded so that a complete octave is disclosed to the pupil. All the octaves are merely duplications. The device may be set up on a table or desk as shown in Figure 6 so that the children can pick out on the dummy keyboard the different keys in both the base sections 5 and 6 and treble sections 7 and 8, and become familiar with the various octaves and the formation of the various scales, chords and intervals. When the child has reached sufficient familiarity to have an acquaintanceship with the nomenclature and the facility to pick out the different keys, the device can be transferred to the piano by folding back the dummy keyboard sections 1, 2, 3 and 4, against the back of the sections 5, 6, 7 and 8. The device can then be placed on the keys behind the black keys so that the keys are aligned with the proper letters on the staff. (See Figure 7.) The pupil having already become acquainted with the keyboard and the nomenclature is now in a position to actually practice upon the piano. The scales are readily mastered by the pupil as the keys are shown in the different scale diagrams and when the device is on the piano are directly indicated. As the various lines indicating the chords, triads are looped to indicate the keys on the chart, a child can more readily comprehend the construction of the chords and triads as well as the intervals and spacing.

When the pupil reaches the stage for the reading of music the staff as placed on the keys will function as a translator of the music for the pupil, that is, the pupil can more quickly associate the keys with the printed notes.

It will thus be seen that this device can be of great benefit in the introduction and instruction of young children into the art of reading music and particularly in assisting them to play a piano.

What I claim is:

1. A piano instruction device comprising a body portion having the representation of the great staff in vertical lines thereon, said body portion foldable along the middle C line of the great staff centrally of the body portion, means for supporting said body portion in a substantially vertical position, the right hand portion of said body portion representing the treble and the left hand portion the base, and a dummy keyboard foldably connected to said body portion, said dummy keyboard foldable centrally thereof to permit of folding of both the body portion and the dummy keyboard about the center axis of said body portion and dummy keyboard.

2. A piano instruction device comprising a body portion of four sections, each of said sections hingeably connected to each of the adjacent sections, said body portion having a vertical representation of the great staff thereon, the lines of the great staff coinciding with proper keys of a piano when placed vertically on the keyboard, means for indicating the proper placing of the body portion on the keyboard of the piano, said body portion extending the length of a piano keyboard and having letters in spaced relationship to indicate the proper nomenclature of each key of the piano when said body portion is placed on the keyboard.

3. A piano instruction device comprising a body portion of four sections foldably connected having the representation of the great staff on said body portion and the nomenclature of the keys, two of said sections adapted to fold back to support said body portion substantially upright and to swing out of position to permit of the placing of the device upon the keys of a piano, and a dummy keyboard portion foldably connected to said body portion, said dummy keyboard portion comprising four sections, the two left hand sections being foldably connected to each other and to the other two right hand sections of the dummy keyboard, said two left hand sections unconnected with the said body portion to permit separable folding of said left hand sections.

4. A piano instruction device comprising a body portion of four sections extending the length of a piano, said body portion having a representation of the great staff thereon and the nomenclature of the keys in spaced relationship to indicate each key of the piano when said body portion is placed on the keyboard, means for indicating the keys of the piano in the chromatic scales, the natural minor scale and the wholetone scale, and a dummy keyboard foldably connected to said body portion to permit of said dummy keyboard being folded back to back of said body portion to permit the placing of said body portion upon the keyboard of a piano.

5. A piano instruction device comprising a body portion extending the length of the piano, a representation of the great staff on said body portion, the lines of the great staff running vertically in spaced relationship of the keys of the piano, means for indicating the keys for the scales, means for indicating the triads, means for indicating the chords, means for indicating the five finger position, and means for indicating the octaves.

6. A piano instruction device comprising a body portion of four sections, foldably connected one to the other, said body portion having a representation of the great staff, means to indicate the keys and nomenclature thereof on said body portion and means to indicate the fundamental groups of keys to indicate the construction of the triads, tetrachords, octaves and scales, and a foldable dummy keyboard foldably connected to said body portion, whereby said instruction device may be utilized in connection with the piano upon the piano keyboard and separately therefrom.

Signed at New York in the county of New York and State of New York this 18th day of April A. D. 1928.

ADDYE YEARGAIN HALL.